(12) United States Patent  (10) Patent No.: US 8,238,250 B2
Fung  (45) Date of Patent: Aug. 7, 2012

(54) QOS-AWARE FLOW-BASED DYNAMIC LOAD BALANCING FOR LINK AGGREGATION

(76) Inventor: Hei Tao Fung, Newark, CA (US)

(*) Notice: Subject to any disclaimer, the term of this patent is extended or adjusted under 35 U.S.C. 154(b) by 308 days.

(21) Appl. No.: 12/580,253

(22) Filed: Oct. 16, 2009

(65) Prior Publication Data

US 2011/0090789 A1 Apr. 21, 2011

(51) Int. Cl.
  G01R 31/08 (2006.01)
  G06F 11/00 (2006.01)
  G08C 15/00 (2006.01)
  H04J 1/16 (2006.01)
  H04J 3/14 (2006.01)
  H04L 1/00 (2006.01)
  H04L 12/26 (2006.01)
(52) U.S. Cl. ............... 370/237; 370/230; 370/235
(58) Field of Classification Search .............. 370/229, 370/230, 235, 237
  See application file for complete search history.

(56) References Cited

U.S. PATENT DOCUMENTS

| | | | |
|---|---|---|---|
| 5,533,021 A * | 7/1996 | Branstad et al. | 370/396 |
| 6,363,077 B1 | 3/2002 | Wong et al. | |
| 6,498,781 B1 | 12/2002 | Bass et al. | |
| 6,510,135 B1 * | 1/2003 | Almulhem et al. | 370/229 |
| 6,512,742 B1 | 1/2003 | Alexander, Jr. et al. | |
| 6,535,504 B1 | 3/2003 | Johnson et al. | |
| 6,614,758 B2 | 9/2003 | Wong et al. | |
| 6,952,401 B1 | 10/2005 | Kadambi et al. | |
| 6,970,420 B1 | 11/2005 | Kalkunte et al. | |
| 6,977,892 B2 | 12/2005 | Kalkunte et al. | |
| 6,981,054 B1 * | 12/2005 | Krishna | 709/235 |
| 6,993,027 B1 | 1/2006 | Kadambi et al. | |
| 7,145,869 B1 * | 12/2006 | Kadambi et al. | 370/229 |
| 7,382,728 B2 * | 6/2008 | Chen et al. | 370/235 |
| 7,545,814 B2 * | 6/2009 | Hiironniemi | 370/395.41 |
| 7,668,103 B1 * | 2/2010 | Pannell et al. | 370/237 |
| 7,898,959 B1 * | 3/2011 | Arad | 370/235 |
| 7,936,770 B1 * | 5/2011 | Frattura et al. | 370/412 |
| 2004/0015599 A1 * | 1/2004 | Trinh et al. | 709/232 |
| 2005/0232274 A1 * | 10/2005 | Kadambi et al. | 370/392 |
| 2006/0098573 A1 * | 5/2006 | Beer et al. | 370/230 |
| 2006/0198381 A1 | 9/2006 | Elangovan et al. | |
| 2007/0041321 A1 * | 2/2007 | Sasaki et al. | 370/235 |
| 2007/0147238 A1 * | 6/2007 | Kadambi et al. | 370/229 |
| 2008/0181103 A1 * | 7/2008 | Davies | 370/230 |
| 2008/0291826 A1 * | 11/2008 | Licardie et al. | 370/230 |
| 2008/0298236 A1 | 12/2008 | Ervin et al. | |
| 2009/0190580 A1 | 7/2009 | Kailasam et al. | |
| 2009/0207857 A1 * | 8/2009 | Alexander, Jr. | 370/474 |
| 2010/0091780 A1 * | 4/2010 | Varanasi et al. | 370/401 |
| 2010/0106866 A1 * | 4/2010 | Aybay et al. | 710/29 |
| 2011/0051602 A1 * | 3/2011 | Matthews et al. | 370/235 |
| 2011/0051735 A1 * | 3/2011 | Matthews et al. | 370/400 |
| 2011/0090789 A1 * | 4/2011 | Fung | 370/230 |

\* cited by examiner

*Primary Examiner* — Michael Thier
*Assistant Examiner* — Benjamin H Elliott, IV

(57) ABSTRACT

A method for dynamic load balancing of packet flows on link aggregation provides dynamic assignment of individual packet flow to egress port that is least congested. The degree of congestion is measured by the utilization of the transmit queues. The dynamic assignments are maintained in a flow table. They are timed out by tracking packet tags in the transmit queues of corresponding scheduling priorities. The load balancing method is aware of quality of service requirements of the traffic and also capable of preserving packet order.

8 Claims, 4 Drawing Sheets

QOS-AWARE FLOW-BASED DYNAMIC LOAD BALANCING FOR LINK AGGREGATION

FIELD OF THE INVENTION

This application related to data communications and more particularly to load balancing on link aggregation in a data communications network.

BACKGROUND

Network devices such as Ethernet switches are interconnected by communication links for receiving and transmitting data packets through physical ports. In order to provide redundancy or larger aggregate bandwidth, some network devices bundle multiple communication links to form link aggregations (LAGs) with their peering network devices. See FIG. 1. The IEEE 802.3ad is one standard specification that allows several physical ports to be bundled together to form a single logical channel. In said specification, however, the load balancing algorithm, that is how to distribute data packets among the physical ports, is not specifically spelled out, leaving room for implementations of different complexities and characteristics.

In many typical implementations, load sharing is statically configured. For example, packet distribution is based on an algorithm that selects a port based on addresses and session information: source address, destination address, or both source and destination addresses. Packets with the same addresses and session information are always sent to the same port in the LAG to prevent out-of-order packet delivery. Static load balancing algorithms do not take into account the amount of traffic assigned to each port and variation in traffic over time, and they therefore results in suboptimal utilization of the link bandwidth.

Some dynamic load balancing algorithms for LAG have been published. They primarily focus on the idea of calculating hash values based on the packets' addresses and session information and mapping the hash values to physical ports based on the measurements of the traffic load on the physical ports. The weakness of said algorithms is that changing the mappings of hash values to physical ports affects all packet flows with the same hash values, and said algorithms fail to address the impact on preventing out-of-order packet delivery when a large number of packet flows are momentarily assigned to different egress ports. Also, said dynamic load balancing algorithms do not deal with the quality of service (QoS) requirements of packet flows.

SUMMARY OF THE INVENTION

A method for QoS-aware dynamic load balancing of packet flows on link aggregation is disclosed. Said method relies on a static load balancing algorithm until near congestion, and in near-congestion condition overrides the default decisions from static load balancing algorithm based on traffic load on physical ports and QoS requirements on a per-flow basis.

In our preferred embodiment, said static load balancing algorithm comprises: calculating a hash value based on the quintuple: destination IP address, source IP address, IP protocol number, destination port number, and source port number; and assigning the egress port based on said hash value. We shall refer to the decisions from said static load balancing algorithm as default port assignments. We shall also use the quintuples to uniquely identify packet flows.

Said near-congestion condition is detected by observing the utilization of the transmit queues of the physical ports in link aggregations. When the transmit queues are full or nearly full, the default port assignments are to be overridden, and the current packet flow is assigned to the physical port that is least congested in the LAG. Also, a flow database is maintained. Each flow entry in said flow database comprises the quintuple of the packet flow, the selected egress port, the selected transmit queue, and the age of the flow entry.

When a packet is to be transmitted over a LAG, the flow database is consulted first and looked up by the quintuple of the packet. When there is a current matching flow entry, the egress port in the flow entry overrides the default port assignment. When there is no current matching flow entry, the default port assignment is used when the default egress port is not in near-congestion condition.

Whether a flow entry is current or not is determined by the age of the flow entry and the current counter value. In our preferred embodiment, a counter and a tag are maintained per transmit queue per physical port. Said counter advances by one unit when a packet, marked by said tag and enqueued in the transmit queue, is transmitted. At any instance, there is at most one packet in a transmit queue marked by said tag. When the packet marked with the tag is transmitted, the tag is free to be attached to the next packet being enqueued in the transmit queue, and the corresponding counter is advanced. When the counter value is significantly different from the age of the flow entry, the flow entry is considered stale and replaceable.

BRIEF DESCRIPTION OF THE DRAWINGS/FIGURES

The present disclosure will be understood more fully from the detailed description that follows and from the accompanying drawings, which however, should not be taken to limit the disclosed subject matter to the specific embodiments shown, but are for explanation and understanding only.

DETAILED DESCRIPTION OF THE INVENTION

A method for QoS-aware dynamic load balancing of packet flows on link aggregation (LAG) is disclosed. Said method relies on a static load balancing algorithm until near congestion, and in near-congestion condition overrides the default decisions from static load balancing algorithm based on traffic load on physical ports and QoS requirements on a per-flow basis.

Static load balancing algorithms are adequate when congestion is far from sight. Taking advantage of that premise, a device that uses the method disclosed herein can dedicate less resource by focusing on dynamic load balancing in near-congestion condition.

In our preferred embodiment, the static load balancing algorithm comprises: calculating a hash value based on a quintuple of the packet consisting of destination IP address, source IP address, IP protocol number, destination port number, and source port number; and assigning the egress port based on said hash value. We shall refer to the decisions from said static load balancing algorithm as default port assignments. We shall also use the quintuples to uniquely identify packet flows. All packets belong to the same packet flow if they have the same quintuple.

As an example, the hash value H is the 16-bit CRC value using the quintuple. One of the P physical ports in the LAG, where P is a positive integer, is selected to be the default egress port by taking modulo P on the hash value.

Figure 1:
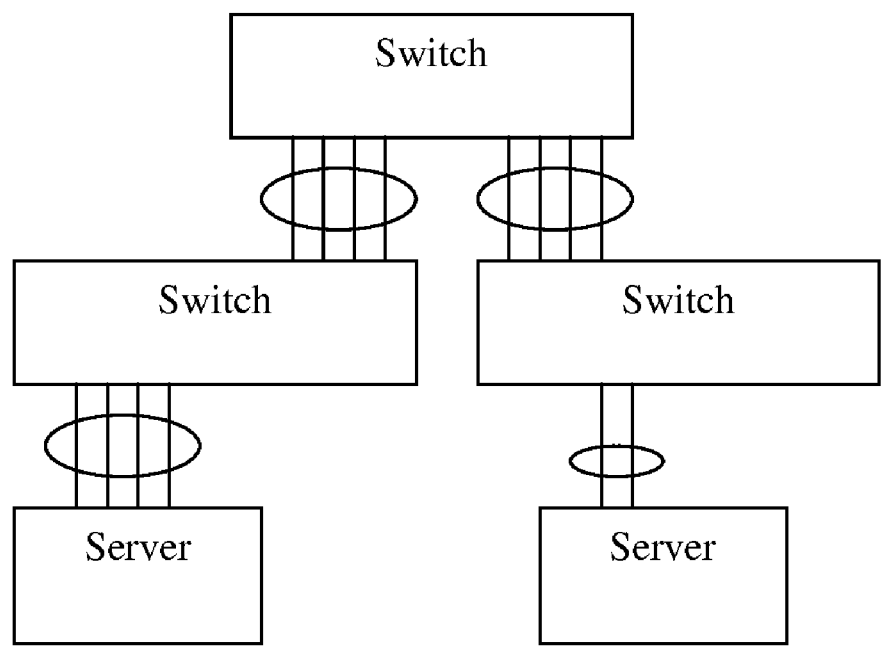
FIG. 1 illustrates an example of a network in which embodiments described herein may be implemented.
Figure 2:
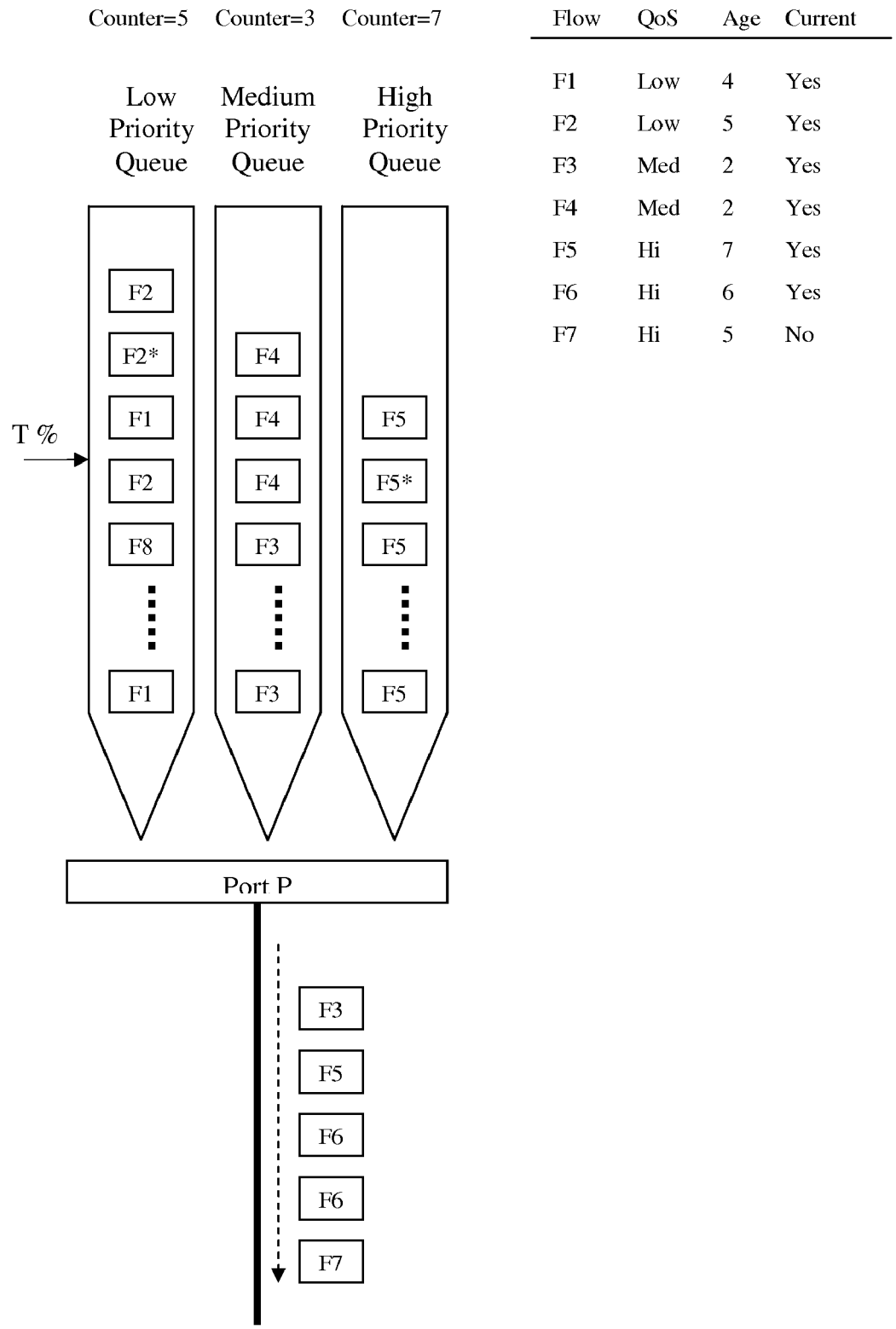
FIG. 2 is a diagram illustrating the concepts of the transmit queues, counters, and age values of flow entries.

In our preferred embodiment, we assume that the device using our method disclosed herein comprises a plurality of transmit queues per physical port, and the transmit queues correspond to different scheduling priorities. For example, there is one high-priority transmit queue, one medium-priority transmit queue, and one low-priority transmit queue for each physical port. A transmit queue is a FIFO for scheduling packets for transmissions. Each packet to be transmitted must first be enqueued to one of the transmit queues of the egress port and scheduled to be transmitted on the physical link. FIG. 2 is an illustration. Each packet flow has its targeted scheduling priority based on its quality of service (QoS) requirements. Packet of a packet flow should be enqueued to the transmit queue corresponding to the targeted scheduling priority.

Near-congestion or congestion condition is detected by monitoring the utilization of the transmit queues of the physical ports in the LAGs. When a transmit queue is 100 percent utilized or full, congestion has occurred, and no more packet can be enqueued in the transmit queue. When a transmit queue is more than T-percent utilized, where T is arbitrarily chosen between 0 and 100, the near-congestion condition has occurred. It is reasonable to choose a very high T value. For example, T is 99.

In near-congestion or congestion condition, the default port assignment should be overridden, and the packet being enqueued and its corresponding packet flow are assigned to the least congested physical port in the LAG that offers the targeted scheduling priority. If all transmit queues that correspond to the targeted scheduling priority of all physical ports in the LAG are full and if reducing the targeted scheduling priority of the packet flow under that circumstance is considered desirable, the packet being enqueued can be assigned to a lower scheduling priority transmit queue of one of the physical ports, bearing in mind that out-of-order delivery might occur. If all transmit queues of all ports in the LAG that can offer the targeted scheduling priority of the packet flow are full, the current packet must be discarded.

Figure 3:
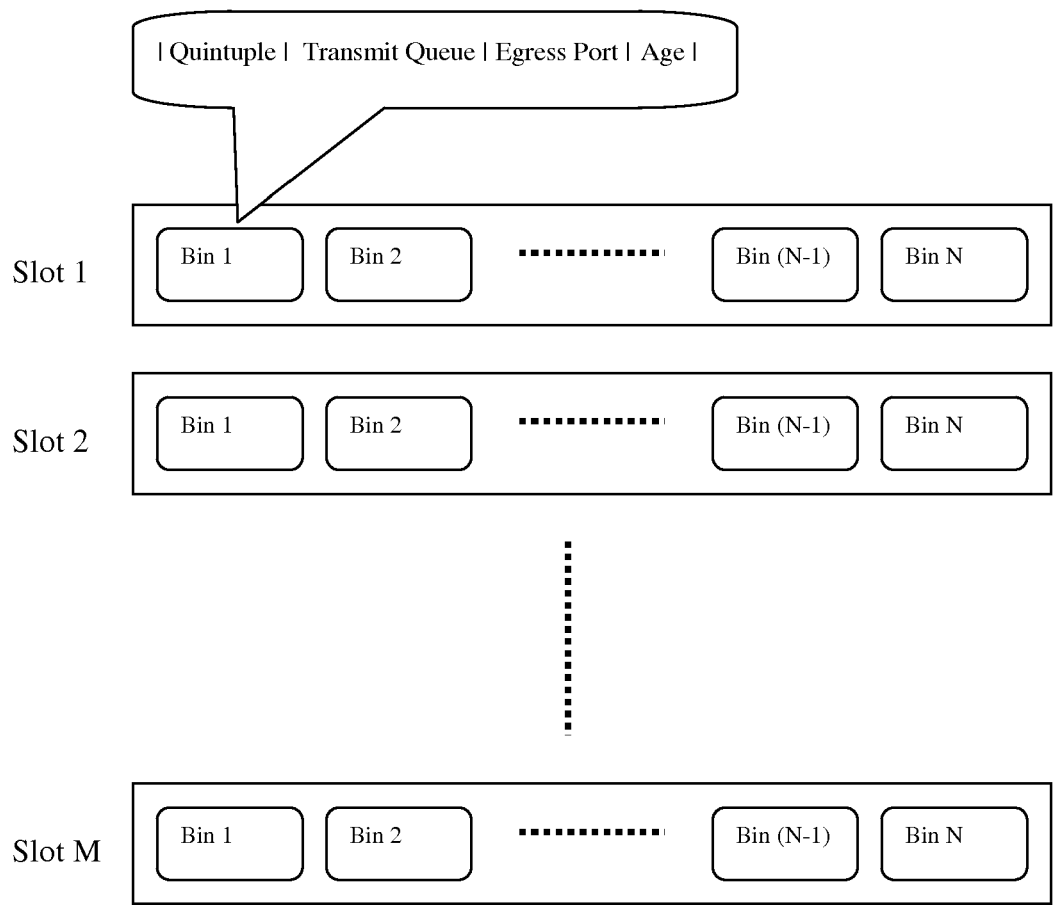
FIG. 3 is a diagram illustrating the flow database in one embodiment.

In order to memorize which packet flows have their default port assignments overridden, a flow database is maintained in the device. In our preferred embodiment, each flow entry in said flow database comprises the quintuple of the packet flow, the selected egress port, the selected transmit queue, and the age of the flow entry. Refer to FIG. 3.

Figure 4:
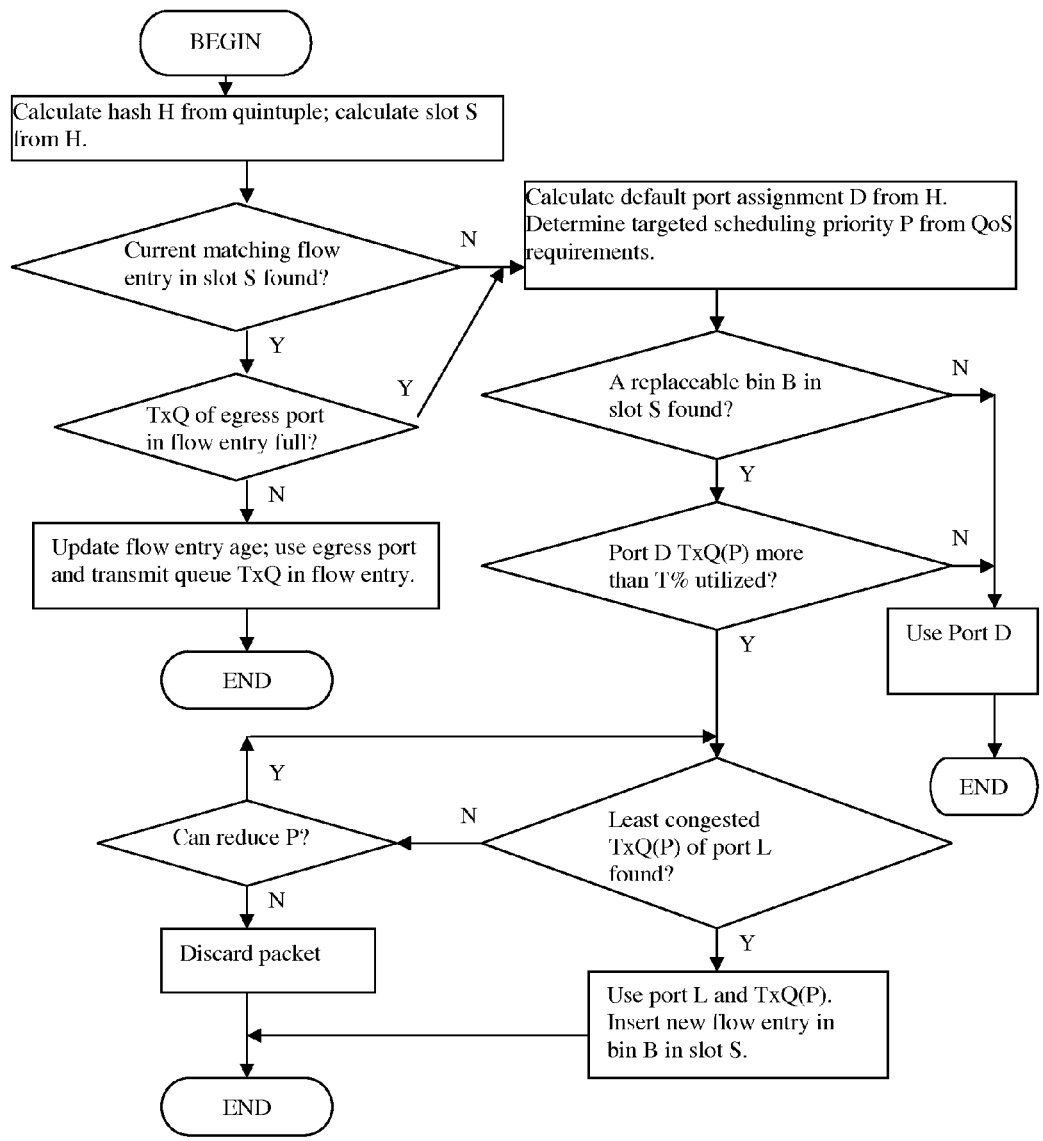
FIG. 4 is a flowchart illustrating the dynamic load balancing algorithm in one embodiment.

When a packet is going through the load balancing decision process, the flow database is consulted first and looked up by the quintuple of the packet. When there is a current matching flow entry, the egress port in the flow entry overrides the default port assignment. When there is no current matching flow entry, the default port assignment is used when the default egress port is not in near-congestion condition. Refer to FIG. 4.

In our preferred embodiment, a counter and a tag are maintained per transmit queue per physical port. Whether a flow entry is current or not is determined by the age of the flow entry and the counter value. Said counter advances by one unit when a packet, marked by said tag and enqueued in the transmit queue, is transmitted. At any time, there is at most one packet in a transmit queue marked by said tag. Marking packet with said tag can be implemented as setting a flag in a packet descriptor, modifying a field in the packet, or appending a field to the packet. That is just a way to differentiate a packet from others. When the packet marked with the tag is transmitted, the next packet being enqueued in the transmit queue is marked with the tag, and the corresponding counter is advanced by one. When a flow entry is inserted into the flow database, the age of the flow entry stores the counter value corresponding to the transmit queue of the egress port assigned, and the transmit queue of the flow entry stores the transmit queue assigned. When the counter value is the same as the age of the flow entry or larger than the age of the flow entry by one, the flow entry is considered current; otherwise, the flow entry is considered stale and replaceable. When the counter is advanced through its upper limit, the counter is allowed to be wrapped around. Because of the wrap-around, some flow entries may be evaluated as current even though they are actually stale. Such side-effect is harmless, only that some entries that would have been replaceable are tied up temporarily. Such side-effect can be removed by removing the stale flow entries in the flow database from time to time.

The purpose of marking packet with said tag and using a counter to count the marking of packet with said tag is for detecting when previous packets of a packet flow has finished transmission at the current moment and therefore new packets of the packet flow can be assigned to different ports in the LAG without the risk of out-of-order delivery for the packet flow.

In the example of FIG. 2, the physical port has three transmit queues of high, medium, and low scheduling priorities. At that moment, there are eight packet flows, and some packets of the packet flows are already transmitted on the link, and some are enqueued in the transmit queues. The symbol F2* indicates that a packet of packet flow F2 has been marked by the aforementioned tag. F5* is a similar case. In the medium-priority transmit queue, there is no packet marked by a tag. That is the case when a packet used to be marked by the tag has been transmitted, but there has been no new packet enqueued since. The next packet enqueued in the medium-priority transmit queue will be marked by the tag: Among all packet flows, F7 is the only stale packet flow in the flow database. It is because the last packet of F7 has been transmitted on the link for some time. The next packet of F7 to be enqueued can now be assigned to any physical port without out-of-order delivery problem. Packet flow F1 is not stale in the flow database because packets of F1 are still in the high-priority transmit queue. Packet flow F6 can be assigned to other physical port without out-of-order delivery problem, but the flow database is still indicating F6 to be current. That is because the counter and tag mechanism is fairly precise but not totally precise in determining when a flow entry becomes stale. When F5* is transmitted and the counter is advanced, F6 will become stale in the flow database. Packet flow F8 is not found in the flow database because the port is the default port assignment for F8.

In our preferred embodiment, the flow database is implemented as a hash table. Refer to FIG. 3. The flow database contains M times N flow entries, where M is the number of slots and N is the number of bins in a slot. Each bin can store one flow entry. To look up a flow entry given a packet, a hash value is calculated based on the quintuple of the packet. We can use the same hash value H used in calculating the default port assignment. The slot S is selected by taking modulo M on the hash value. Then the quintuple of the current packet is compared against the quintuple of each current flow entry in the N bins of the selected slot S. The comparisons can be done in parallel if the device is capable of parallel processing. To insert a new flow entry given a packet, the look-up described is done to make sure that no current flow entry among the N bins has the same quintuple so as to avoid duplicate flow entries. Then any one of the N bins that does not contain a current flow entry can be replaced.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for providing dynamic load balancing on a link aggregation, of a network device comprising more than one ports and a flow table capable of storing a plurality of flow entries, each of said flow entries comprising a look-up key and a selected egress port, for a packet from a plurality of packets to be transmitted out on said link aggregation, the method comprising:

assigning to said packet from a plurality of packets a default egress port out of said more than one ports using a hash value generated from header information of said packet from a plurality of packets;

detecting a congestion condition on said default egress port; and transmitting said packet from a plurality of packets on said selected egress port of one of said flow entries when said one of said flow entries is found using said header information of said packet from a plurality of packets, and transmitting said packet of a plurality of packets on said default egress port when none of said flow entries is found using said header information of said packet from a plurality of packets and said default egress port is not in said congestion condition, and transmitting said packet on a least congested port among said more than one ports and installing a new flow entry, whose look-up key is formed using said header information of said packet of a plurality of packets and which records said least congested port among said more than one ports as said selected egress port of said new flow entry, on said flow table when none of said flow entries is found using said header information of said packet from plurality of packets and said default egress port is in said congestion condition.

2. The method of claim 1, wherein each of said ports comprising a plurality of transmit queues, each of said transmit queues corresponding to one of a plurality of transmission scheduling priorities, said least congested port offers the least utilized transmit queue among said transmit queues of said ports corresponding to a lower transmission scheduling priority, among said plurality of transmission scheduling priorities, than a transmission scheduling priority originally intended for said packet, and said packet is enqueued to said transmit queue of said least congested port corresponding to said lower transmission scheduling priority.

3. The method of claim 2, wherein said transmission scheduling priority originally intended for said packet is based on quality of service requirements of said packet.

4. The method of claim 2, wherein said default egress port is in said congestion condition when the transmit queue of said default egress port corresponding to said transmission scheduling priority originally intended for said packet is utilized beyond a user specified percentage.

5. The method of claim 2, wherein a transmit queue of said plurality of transmit queues has a counter and a marking tag, and the usage of said counter and said marking tag comprises: incrementing said counter by one when any packet marked with said marking tag enqueued in said transmit queue is transmitted; and marking any packet being enqueued in said transmit queue with said marking tag when there is no other packet in said transmit queue marked with said marking tag.

6. The method of claim 5, wherein said each of said flow entries further comprises: an age and a selected transmit queue, wherein said selected transmit queue records said least utilized transmit queue when installing said new flow entry, and said age records the current value of said counter of said least utilized transmit queue of said selected egress port when installing said new flow entry or when said one of said flow entries is found.

7. The method of claim 6, wherein said one of said flow entries is considered stale and invalid when the current value of said counter of said selected transmit queue of said selected egress port recorded in said one of said flow entries is not equal to nor larger by one than the value of said age recorded in said one of said flow entries.

8. The method of claim 1, wherein said flow database is structured into M slots of N bins per slot, where M and N are positive integers, and said one of said flow entries is located at one of the N bins in one of the M slots based on a second hash value of said header information of said packet.

* * * * *